Figure 1:
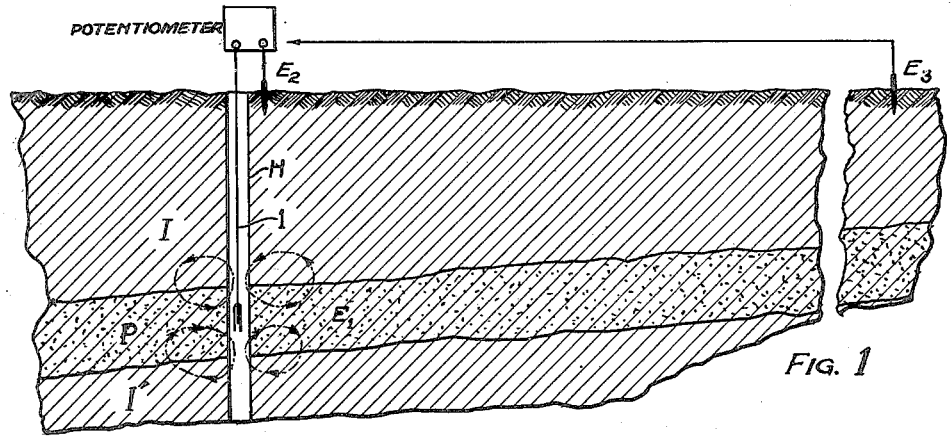

Nov. 14, 1939. J. J. JAKOSKY 2,179,593
ELECTRICAL METHOD AND APPARATUS FOR DETERMINING THE CHARACTERISTICS
OF A GEOLOGICAL FORMATION TRAVERSED BY A BORE-HOLE
Filed Sept. 28, 1936

John J. Jakosky
INVENTOR.

Patented Nov. 14, 1939

2,179,593

UNITED STATES PATENT OFFICE 2,179,593

ELECTRICAL METHOD AND APPARATUS FOR DETERMINING THE CHARACTERISTICS OF A GEOLOGICAL FORMATION TRAVERSED BY A BORE-HOLE

John Jay Jakosky, Los Angeles, Calif., assignor to Schlumberger Well Surveying Corporation, Houston, Tex., a corporation of Delaware Application September 28, 1936, Serial No. 103,038

22 Claims. (Cl. 175—182)

This invention relates to a method and apparatus for determining the nature and characteristics of the geological formations of the subsurface and pertains more particularly to the determination of the electro-chemical properties of the geological formations traversed by a drill-hole.

More specifically, this application relates to the determination of inhomogeneities in the electro-chemical properties of the underground structure. Such inhomogeneities may be due, for example, to the presence of mineralized bodies or the like, contacts of acidic and basic rocks, rocks containing different types of ground waters, etc. More specifically, the subject of this invention comprises an electrical method of underground survey, wherein studies are made at different depths within a drill-hole, of the electro-chemical potentials associated with the flow of a uni-directional current through the various strata comprising the earth. The current passing through the earth may be a current caused to flow by creating a constant or uni-directional potential between two electrodes, so positioned as to cause the bore-hole being studied to be within the effective path of current flow, or the current flowing through the earth may be the natural ground currents which are regional in character and flowing through practically all parts of the earth's surface.

The measurement of filtration and concentration potentials by employing one moving electrode within a bore-hole and another at the surface of the ground near the mouth of the bore-hole, is known to the art. That method consists in studying the various strata with reference to their porosity and their pressure, by taking measurements of electrical potentials existing at various depths in the uncased part of the drill-hole, after filling the drill-hole with water. The process is based on the phenomenon known as electro-filtration, i. e., the occurrence of an electro-motive force whenever an electrolyte flows through a porous dielectric; for instance, when water filters through a layer of sand.

Such an electro-motive force is known to depend both on the chemical constitution of the liquid under filtration, and on the dielectric constituting these filters. Its order of magnitude is proportional to the pressure which causes the filtration. In most cases the sign of this electro-motive force is such that the electric current which it causes to flow possesses the same direction as the liquid in movement. In the porous strata, electro-motive forces caused by osmotic or chemical phenomena (chiefly due to difference in concentration of the salt content of the drilling mud and the imbibed water of the strata) may be superposed on the electro-motive forces generated by electro-filtration. The electro-potentials caused by difference in concentration may be explained as follows (C. and M. Schlumberger and E. Leonardon, "A new contribution to subsurface studies by means of electrical measurements in drill holes", A. I. M. M. E. Tech. Pub. No. 503), by reference to Figure 1 hereof:

"Consider a drill-hole H, filled with sweet water. The hole encounters a porous sand layer P, containing salt water, and comprised between two impervious argillaceous layers I and I'. Experience shows that even in the absence of a difference between the rock pressure and the head of the water filling the hole, a negative potential is observed in the diagram of the electrical potentials along the drill hole, at the intersection with the porous layer. An electro-motive force is set up, caused by the difference in concentrations of the electrolytes coming into contact in the region of the layer P. The water in this layer, rich in dissolved salts, is positive in comparison to the sweet water in the hole, and the electric current that is caused to flow into the porous layer and the surrounding rocks follows the paths shown in Figure 1. In other words, there is a 'concentration element', and the local differences in potential registered correspond to the ohmic drop caused by the flow of electric current in the water filling the hole.

"If, in addition, there exists an electro-motive force of filtration in the hole and the fluid in the layer, the two phenomena are superimposed, and only the resulting effect will be observed."

The above phenomena associated with filtration and concentration effects occur spontaneously at the contact of the porous sands and fluids, and their effects are limited chiefly to the relatively small region surrounding the contact.

Figure 2:
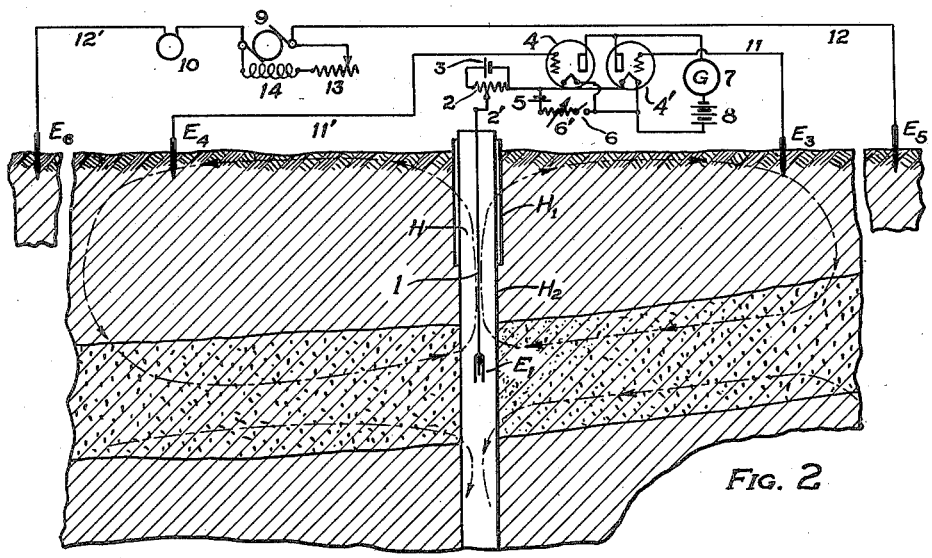

The accompanying drawing illustrates schematically the above described method of bore-hole surveying as compared with the method of the present invention and also shows forms of apparatus in accordance with this invention. Referring to the drawing:

Figure 1 is a sectional view of a portion of the earth's surface showing a schematic layout of apparatus which may be used according to the above described prior method of bore-hole surveying. In addition, the view shows the use of a distant electrode, which is in accordance with this invention;

Figure 2 is a section of the earth's surface showing schematically an improved type of potential measuring system, together with a means of energizing the earth using an external power source. This figure also shows diagrammatically the general path taken by the currents caused by galvanic action in a cased well. These galvanic currents are not local in extent (as are the weak filtration and concentration potentials) but flow to the surface along the casing.

Figure 3:
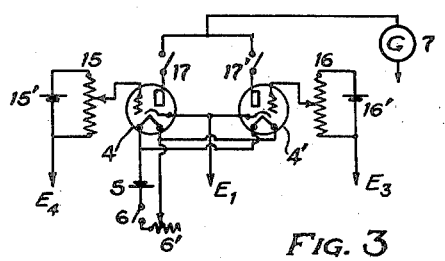

Figure 3 is an alternative and more flexible form of potential measuring apparatus which may be used in place of the apparatus shown in Figure 2.

In the general apparatus arrangement for various types of earth potential measurements illustrated in Figure 1, electro-potential measurements according to the prior methods described above are made between a surface electrode $E_2$, near the mouth of the bore-hole H, and a second electrode $E_1$, which is lowered within the bore-hole on an insulated cable $l$.

Measurement of these potentials is not easily applicable to cased bore-holes, since the contact between the porous strata and the drill-hole fluid is not present. Furthermore the method practically would be inoperative due to the short circuiting effect of the metallic casing since the electrode $E_1$ is within the casing and $E_2$ is adjacent the casing, or connected thereto at the surface of the ground. Also, when potential measurements are attempted in cased holes, the galvanic potentials created by the metallic iron casing and the fluids in the various strata, cause erratic readings.

The method described in this invention is not concerned with the electro-filtration potentials created when a fluid flows through a permeable or semi-permeable medium or with the "concentration element" effects. This invention is concerned with a measurement of the potentials associated with the electro-chemical effects created by the flow of an electric current through electrolytes of different types. These potentials are sometimes referred to in the literature as "polarization" or "over-voltage" potentials. Many variables are encountered in the practical application of these measurements to the actual drill-holes, but a simple example may be employed to illustrate the general nature of the electro-chemical effects taking place in the earth. When two electrodes are placed in contact with moist rock comprising the earth's surface, they form, in effect, a galvanic cell. The flow of electricity through the rock material comprising the "galvanic cell" is by means of electrolytic conductivity. The current is carried by an electrolyte consisting of water solutions of various soluble mineral salts. The factors affecting the conduction are those that affect electrolytic conduction in general, although the effect of these factors may be modified somewhat by the artificial conditions imposed by such rocks. The electric current is conducted by the transfer of ions through the solution. These ions may be in part those of the solvent itself, but mainly are the ions formed by dissolution of the soluble salts forming the solute. The specific conductance of any solution will depend mainly upon (1) the concentration of the ions present, (2) their mobility, i. e., the velocity of their migration, and (3) their electrical charge. The concentration of the ions will depend upon the concentration of the electrolyte and upon its degree of ionization. With increase in concentration, the specific conductance will increase due to the larger number of ions present, but generally reaches a maximum and then decreases due to the smaller ionization and greater friction to the ionic motion, at the higher concentration. The resistance of electrolytes decreases with rising temperature, often very rapidly over the lower range of temperature. This is attributed to the decrease in viscosity of the solution, and the corresponding increase in the velocity of the ions. The rate of decrease of the resistance becomes less as the temperature increases due to the rate of decrease in dissociation with the rising temperature. The flow of an electric current through an electrolyte causes a redistribution of its ions, with a resultant change in the potential drop between the electrodes. Conditions within a simple galvanic cell will be reversible if every substance composing it is in a stable state, and if a very small increase in the applied external electro-motive force will cause reactions which will be exactly reversed by a very small decrease in the electro-motive force. If, on the contrary, any actual process brought about by chemical reaction or by electrolysis is taking place within the cell, the system will be undergoing an irreversible change and its electro-motive force will vary with the time and the magnitude of current flow. An electric current flowing through the earth for a sufficient period of time causes a certain electrochemical potential to be created, which is greater than would be accounted for by the ohmic effect of the current flowing. Due to the relatively long periods of time during which the current may flow in the subsurface, this electro-chemical potential reaches an ultimate maximum value and remains relatively constant thereafter. The magnitude of this potential will depend upon the characteristics of the strata, the concentration and nature of the salts carried by the various strata, the percentage of ground moisture or water present, and the sub-surface temperatures. The measurement of this electro-chemical potential is the prime object of this invention. These measurements may be made in a cased or uncased drill-hole, and even the salinity of the drilling mud does not usually affect the relative values observed for the different strata. The magnitude of the electro-chemical effects caused by the flow of current through different strata will vary with the amount and the nature of the electrolytes contained within that particular strata. Strata containing water of relatively low salt content usually give less effects than strata which contain waters of high salt content. The electro-chemical effects from strata containing fresh water is practically zero, while the effects of strata containing water of high salinity is usually quite high. Since the bore-hole penetrates strata of different characteristics, the potential will vary from stratum to stratum. By means of an exploring potential electrode it is therefore possible to determine the electro-potentials existing in the various strata penetrated by the drill-hole. The methods of measuring such potentials, and at the same time eliminating the ohmic effects due to the flow of natural earth currents, will be described in the latter part of this specification, and constitute an important part of this invention.

Electric currents of varying intensities and direction of flow are present in the surface of the earth. Numerous investigators have studied such earth currents and a general résumé of such work is contained in a paper of Dr. O. H. Gish of the Department of Terrestrial Magnetism, Carnegie Institute of Washington, "The natural electric current in the earth's crust", published in the Scientific Monthly for January, 1931. This paper and other related literature indicates "that the primary source of earth current storms is some factor seated outside the earth and likely in the atmosphere of the sun". Furthermore there is a close similarity of the changes of earth current and terrestrial magnetism. Evidence indicates that there is a relationship between the earth currents and sunspots. Another line of evidence which supports this view depends upon the fact that as the sun rotates it carries about with it the sun-spots. Those which are of sufficiently long life will thus appear on the earthward side of the sun at intervals corresponding to the periods of rotation of the sun, about twenty-seven days. This is the general time period of the variations in earth currents. Less conspicuous, but no less interesting and important, are variations in earth currents which proceed in a regular manner throughout the day. These are usually termed diurnal variations. One common feature of diurnal variations is that during the daylight hours the earth currents are more active than at night. The natural earth currents are not only of considerable time duration, but in addition flow over large lateral distributions and it may be considered that these currents flow substantially parallel to the surface of the earth. The component of the earth current flowing in a vertical direction is relatively small and usually may be neglected. Referring therefore to Figure 1, it will be seen that measurements made between electrodes $E_1$ and $E_2$ (because of the relative small distance penetrated by any drilled well to date) are relatively free from the effects of earth current, whereas measurements made between electrode $E_1$ and a distant electrode $E_3$ will be influenced to a large extent by such earth currents. This therefore necessitates the use of a distant electrode. The distant electrode should be placed as far as possible from the bore-hole being surveyed, and preferably at distances greater than one-third the depth of the bore-hole. For example, if the well to be surveyed has a depth of 3000 feet, for best results the distant electrode should be placed not nearer than 1000 feet, and preferably at a distance of at least 3000 feet. Throughout a series of comparative measurements with the electrode $E_1$ at different depths in the hole, the distant electrode $E_3$ is preferably maintained at a fixed position.

To separate the variable ohmic potentials caused by the changing earth currents and the galvanic potentials if the well is cased, from the weaker but relatively time-constant polarization potentials, it is preferable to employ a special type of measuring system. This system constitutes an important phase of the invention, and referring to Figure 2: an electrode $E_1$, in contact with the fluid in the drill-hole H, is suspended from an insulated cable I. Means are provided at the surface of the ground so that cable I may be lowered into the well in such a manner as to allow continuous readings to be made as the electrode $E_1$ traverses the bore-hole or the cable may be lowered to any desired depth and the readings made at that particular depth. In practice the cable I is wound upon a drum provided with proper hoisting mechanism and controls. The surface end of the cable is connected to the proper measuring apparatus by means of a conventional commutator and brush arrangement, not shown. Metallic surface pipe $H_1$ and casing $H_2$ are shown to illustrate the general path of flow for the galvanic currents. Except for this one feature, it will be understood that this explanation of Figure 2 may be either a cased or uncased drill hole. The preferred form of measuring apparatus consists of two thermionic vacuum tubes differentially connected. A potentiometer 2, connected to a battery 3, is employed for obtaining proper bias on the vacuum tubes, and for neutralizing the spurious earth potentials which may exist between electrodes at the surface of the ground and the electrode in the well. The surface end of the cable I is connected to the sliding arm 2', of the potentiometer. The filaments of the vacuum tubes 4 and 4', may be energized by means of a battery 5, connected to the filaments, and in series with a switch 6, and rheostat 6', for controlling the flow of current. The grid of vacuum tube 4, is connected to a distant electrode $E_4$, while the grid of vacuum tube 4', is connected to a distant electrode $E_3$. Electrode $E_1$ is connected to the filaments of the tubes by means of the bias potentiometer as indicated. The plate circuits of the two thermionic vacuum tubes are connected in parallel through a galvanometer 7, preferably of the recording type, and "B" supply 8. An alternative vacuum tube arrangement is illustrated in Figure 3 and comprises; a separate bias potentiometer for the grid of each vacuum tube. A potentiometer 15, connected to a bias battery 15', is connected into the circuit between the distant electrode $E_4$ and the grid of the tube 4. A similar potentiometer 16, connected to a battery 16', is connected into the circuit between the electrode $E_3$ and the grid of the tube 4'. The thermionic tubes illustrated in this figure are of the indirect heater type and the cathodes are tied together and connected to electrode $E_1$. The filaments are heated by means of battery 5, connected in series with a switch 6, and a rheostat 6', for controlling the flow of current. It will be apparent that various types of thermionic tubes may be employed for carrying out the general steps necessary.

In regions where ground currents are particularly troublesome and vary considerably in a lateral direction from the well, the arrangement shown in Figure 3 is preferable since it allows proper bias adjustment to be obtained for each of the vacuum tubes. The plate circuit of each of the tubes is provided with a switch. Initial adjustment of the equipment may be obtained, for instance, by first opening the switch 17, which is connected to the plate of tube 4, and then properly adjusting the bias on potentiometer 16 to provide the proper plate current flow in tube 4'. The switch 17' is then opened and the switch 17 closed. The plate current for tube 4 is now adjusted to proper value by means of the potentiometer 15. After both tubes have been adjusted to the proper value the switches 17 and 17' are both closed and the instrument is ready for operation.

Generally, ground currents flow in a definite direction over large extended areas. Under such conditions, the surface electrodes $E_3$ and $E_4$ are preferably placed in a straight line passing through, and at the same distance from, the bore-hole. Analysis of the circuit will show that with the electrodes all placed in a stra'ght line, the same approximate difference of potential will exist between $E_1$ and $E_4$ as between $E_1$ and $E_3$. Furthermore the polarity of these two potentials will be opposite with respect to the electrode in the well. Since these potentials are applied to the grids of the respective tubes, it will be seen that if electrode $E_4$ is positive with respect to electrode $E_1$, that the current flowing in the plate circuit of vacuum tube 4 will be increased, while the current flowing in the plate circuit of vacuum tube 4' will be decreased. If the two tubes are operating on the straight line portion of their grid-plate current characteristics, the increase in the plate current of 4 will be offset by the decrease in the plate current of 4'. As a result there will be no over-all change in the plate current of the two tubes. The recording meter 7 will therefore remain stationary. This arrangement effectively eliminates the ohmic potentials existing due to the flow of earth current, as well as irregularly distributed galvanic potentials created by the casing when measurements are made in a cased well.

In areas where extreme variations in ground currents are encountered, such as in regions where considerable leakage takes place from electric power and railway circuits, it is preferable to employ three surface electrodes and three correspondingly connected vacuum tubes. These three electrodes preferably are equally spaced from the well, and oriented 120° from the mouth of the well. When using three surface electrodes it can be shown by Kirchhoff's law that the earth current will be neutralized and that no component will exist which will affect the electrochemical readings.

In certain instances in uncased wells where the ground currents may be of uniform intensity and direction, the general direction of such currents may be determined and in that case only one surface electrode need be employed. Under such conditions the surface electrode $E_3$ is placed in such a position from the well that it is at right angles to the general line of current flowing through the earth.

For convenience, the distant electrode may comprise the casing or drill-pipe of another well located at a sufficient distance from the well undergoing measurement. In some instances where special data are desired, the distant electrode may be lowered by means of an insulated cable to the bottom of another well or lowered at the same rate and/or at the same stratigraphic depth, as in the well being measured.

In areas where the ground currents are fairly constant, the distant electrode may be oriented at any angle with the well without introducing serious errors in the readings. It will be understood however, that any variation in magnitude or direction of the ground currents will introduce proportional changes in the indicated electrochemical potentials. Such anomalous changes may be serious when attempting to correlate the potential-depth curves of different wells.

A single distant electrode is not satisfactory for work in cased holes since the effects of earth currents are greatly increased and are usually quite large and mask the true electro-chemical potentials of the strata. It will be recognized that such sporadic potentials must be practically eliminated before correlations can be made between cased and uncased logs. In certain areas, such as the "heaving shale" region of Louisiana and Texas, and where bad caving conditions are encountered, it is preferable from the operator's viewpoint to set casing with a minimum of delay and in some cases it is advantageous to conduct these surveys through the drill pipe itself. Erratic potentials must therefore be practically eliminated in order that the electrical log of the cased well will be correct and therefore of value for correlation with logs made in open holes along the same structure. The multi-electrode systems described in Figures 2 and 3 are preferable for such work.

In certain areas it may be found that the ground currents are not of sufficient magnitude or constancy to create measurable electro-chemical potentials. Under these conditions an auxiliary supply of current may be passed through the earth. The general arrangement for such energization of the ground is illustrated in Figure 2. The electrodes $E_5$ and $E_6$ are positioned in a line with potential electrodes $E_3$ and $E_4$, but spaced therefrom, and preferably equally spaced from the well. The distance from the bore-hole to $E_5$ and $E_6$ should preferably be at least equal to the depth of the bore-hole. A generator 9, supplying direct current (usually at a potential of 200 volts or less) is employed for energizing the ground. An ammeter 10, may be used for maintaining the proper flow of current. The ohmic drop between potential electrodes $E_3$ and $E_4$, created by the flow of current between power electrodes $E_5$ and $E_6$, will be balanced out by means of the differential vacuum tube arrangement illustrated. The electrode $E_1$ will therefore again measure only the electro-chemical potentials created by the flow of current in the various strata. Any other suitable source of uni-directional current may be employed.

In conducting the actual survey of a well utilizing the methods described in this application wherein natural ground currents are utilized, the general field procedure is somewhat as follows. The truck containing the cable and measuring apparatus is placed at a convenient point near the well. By means of a sheave wheel over the mouth of the well the cable is lowered so that the electrode $E_1$ is in contact with the fluid in the bore-hole. The recording galvanometer 7, is now adjusted for recording any variation which may take place in the plate circuit of the two vacuum tubes. Electrodes $E_3$ and $E_4$ are buried in the ground and connected by means of insulated cables 11 and 11', to the respective grids of their vacuum tubes, as shown in Figure 2. The potentiometer 2, is now adjusted, by proper movement of the sliding arm 2', to balance out the natural ground potentials existing between $E_1$ and the balanced differential circuit, and to obtain the proper plate current. The electrode $E_1$ is lowered into the bore-hole and a continuous or intermittent record made of the combined plate current variation through the galvanometer 7 from any desired depth to any other desired depth, to give a record of variations in the relative values of potential between the electrode $E_1$ and each of the electrodes $E_3$ and $E_4$. In some cases the entire interval between the surface and the bottom of the bore-hole may be recorded, while in other cases it may only be necessary to record that short interval of the bore-hole in which subsurface information is desired.

In cases where the natural ground currents are not of sufficient magnitude or constancy to give reliable electro-chemical readings, then the auxiliary power supply is employed. When utilizing this power supply the general set-up of potential measuring apparatus is the same as described for the natural earth current method. In addition, the electrodes $E_5$ and $E_6$ are imbedded in the ground and connected by means of insulated cables 12 and 12', to the generator 9 and indicating meter 10. The current is adjusted to the proper value, governed by prior experience in the area, by means of field rheostat 13, which controls the current passing through the generator field 14. The time required for the current to create a measurable electro-chemical potential difference will depend upon the characteristics of the electrolyte in the soil, the resistance of the soil, and the magnitude of the current flowing. As a general rule however, in areas of normal soil encountered in survey work in California, I have found that a current of two amperes passing into the ground for a period of three hours is sufficient to give the desired electro-chemical differences.

I claim:

1. A method for determining the nature and thickness of the strata traversed by a drill-hole at different depths, which comprises: measuring the changes in potential between an electrode within the drill-hole and an electrode distant from the drill-hole, when said electrode within the drill-hole is at different depths below the surface, said second-named electrode being located at a distance from said drill-hole greater than one-third the depth of said first-named electrode below the surface.

2. A method for determining the character and thickness of the strata traversed by a drill-hole at different depths, which comprises: measuring the changes in potential between a moving electrode traversing a drill-hole and an electrode remote from the drill-hole, while said electrode within the drill-hole is at different depths below the surface, said second-named electrode being located at a distance from said drill-hole greater than one-third the depth of said first-named electrode below the surface.

3. A method for determining the nature and thickness of the strata traversed by a drill-hole at different depths, which comprises: measuring the changes in potential created by the flow of natural earth currents through the regions surrounding the drill-hole, between an electrode within a drill-hole and an electrode distant from the drill-hole when said electrode within the drill-hole is located at different depths below the earth's surface, said second-named electrode being located at a distance from said drill-hole greater than one-third the depth of said first-named electrode below the surface.

4. A method for determining the character and thickness of the strata traversed by a drill-hole at different depths, which comprises: measuring the changes in potential created by the flow of a uni-directional electrical current through the regions surrounding the drill-hole, between an electrode within the drill-hole and an electrode distant from the drill-hole when said electrode within the drill-hole is located at different depths below the earth's surface, said second-named electrode being located at a distance from said drill-hole greater than one-third the depth of said first-named electrode below the surface.

5. A method of determining the nature and thickness of the strata traversed by a drill-hole at different depths, which comprises: passing an electric current through the earth in the region surrounding a drill-hole, between a pair of current electrodes connected to the earth at positions removed from said drill-hole, and measuring the changes in potential between an electrode in the drill-hole and an electrode connected to the earth at a position removed from the drill-hole by a distance greater than one-third the depth of the electrode in a drill-hole, during the passage of said current, as said electrode within the drill-hole is moved to different depths in the drill-hole, said current electrodes being spaced from the drill-hole by a distance greater than the depth of the electrode in the drill-hole.

6. A method for determining the nature and thickness of the strata traversed by a drill-hole at different depths which comprises: measuring variations in the relative values of potentials between an electrode within said drill-hole and a plurality of electrodes connected to the earth at positions removed from the drill-hole in different directions therefrom during the flow of a unidirectional electric current through the earth strata in the region surrounding the drill-hole, as the first mentioned electrode is moved to different depths.

7. A method for determining the nature and thickness of the strata traversed by a drill-hole at different depths which comprises: measuring variations in the relative values of the potentials between an electrode within said drill-hole and a plurality of electrodes connected to the earth at positions removed from the drill-hole in different directions therefrom during the flow of an electric current through the earth strata in the region surrounding the drill-hole, as the first mentioned electrode is moved to different depths.

8. A method for determining the nature and thickness of the strata traversed by a drill-hole at different depths which comprises: measuring variations in the relative values of the potentials between an electrode within said drill-hole and two electrodes connected to the earth at positions remote from the drill-hole and in opposite directions therefrom during the flow of a unidirectional electric current through the earth strata in the region surrounding the drill-hole, as the first mentioned electrode is moved to different depths.

9. A method for determining the nature and thickness of the strata traversed by a drill-hole at different depths which comprises: measuring variations in the relative values of the potentials existing between an electrode within said drill-hole and two electrodes connected to the earth and removed from the drill-hole and in opposite directions therefrom, while passing a unidirectional electric current through the earth strata in the region surrounding the drill-hole, between two other electrodes which are electrically connected to the earth and spaced from one another in a direction along the earth's surface, as the first mentioned electrode is moved to different depths.

10. A method for determining the nature and thickness of the strata traversed by a drill-hole at different depths which comprises: measuring variations in the relative values of the potentials between an electrode within said drill-hole and two electrodes connected to the earth at positions equally spaced and in opposite directions from said drill-hole, during the flow of a uni-directional current through the earth strata in the region surrounding the drill-hole, as the first mentioned electrode is moved to different depths.

11. A method for determining the nature and thickness of the strata traversed by a drill-hole at different depths which comprises: measuring variations in the relative values of the potentials between an electrode within said drill-hole and three electrodes connected to the earth at positions removed from the drill-hole along lines approximately 120° apart during the flow of a unidirectional current through the earth strata in the region surrounding the drill-hole, as the first mentioned electrode is moved to different depths.

12. A method for determining the nature and thickness of the strata traversed by a drill-hole at different depths which comprises: measuring variations in the relative values of the potentials between an electrode within said drill-hole and three electrodes connected to the earth at positions equally spaced from the drill-hole along lines approximately 120° apart during the flow of a unidirectional current through the earth strata in the region surrounding the drill-hole, as the first mentioned electrode is moved to different depths.

13. A method of determining the nature and thickness of the strata traversed by a drill-hole at different depths, which comprises: passing an electric current through the earth in the region surrounding a drill-hole, between a pair of current electrodes electrically connected to the earth and positioned at opposite sides of said drill-hole and located substantially on a straight line passing through said drill-hole; and measuring variations in the relative values of the potentials between an electrode within said drill-hole and a pair of potential electrodes electrically connected to the earth at positions substantially on said straight line and on opposite sides of said drill-hole, as said electrode within said drill-hole is moved to different depths and during the passage of said current.

14. A method as set forth in claim 13, each of said potential electrodes being located at a distance from said drill-hole greater than one-third the depth below the surface of said electrode within the drill-hole.

15. A method as set forth in claim 13, each of said potential electrodes being located at a distance from said drill-hole greater than one-third the depth below the surface of said electrode within the drill-hole, and each of said current electrodes being located at a distance from said drill-hole greater than the depth below the surface of said electrode within the drill-hole.

16. A method of determining the nature and thickness of the strata traversed by a drill-hole at different depths, which comprises: passing a unidirectional electric current through the earth in the region surrounding said drill-hole, between a pair of current electrodes electrically connected to the earth at positions removed from said drill-hole, for a sufficient time to create measurable electrochemical potentials in the region traversed by said current; and measuring variations in the relative values of the potentials between an electrode within said drill-hole and a pair of potential electrodes electrically connected to the earth at positions removed from said drill-hole in different directions by a distance greater than one-third the depth of the electrode in the drill-hole, as said electrode within said drill-hole is moved to different depths and during the passage of said current, said current electrodes being spaced from the drill-hole by a distance greater than the depth of the electrode in the drill-hole.

17. An apparatus for use in determining the nature and thickness of a geologic formation traversed by a drill-hole, which comprises: an electrode suspended in said drill-hole; means for moving said electrode to different depths in said drill-hole; a plurality of electrodes electrically connected to the earth and located in different directions from said drill-hole; a thermionic vacuum tube recording circuit; and insulated conductors connecting each of said electrodes to said circuit.

18. An apparatus for use in determining the nature and thickness of a geologic formation traversed by a drill-hole, which comprises: an electrode suspended in said drill-hole; means for moving said electrode to different depths in said drill-hole; a pair of electrodes electrically connected to the earth and located in different directions from said drill-hole; a thermionic vacuum tube circuit including a pair of vacuum tubes having associated grid circuits and plate circuits, the grid circuits of the respective tubes being connected to said electrode in the drill-hole and to the respective electrodes of said pair of electrodes; and a current indicating instrument connected to the plate circuits of both tubes in parallel.

19. A method of investigating the strata traversed by a drill hole which comprises measuring the electrochemical potential changes created between an exploring electrode within the drill-hole and a grounded electrode in circuit therewith by the flow of unidirectional electric current through the electrolytes within the strata, said grounded electrode being located at a position sufficiently remote from the drill-hole so that the measured potential changes are influenced primarily by the horizontal component of said current.

20. A method of investigating the strata traversed by a drill-hole which comprises measuring the electrochemical potential changes created between an exploring electrode within the drill hole and a grounded electrode in circuit therewith by the flow of unidirectional electric current through the electrolytes within the strata, said grounded electrode being spaced from the drill-hole by a distance greater than one-third the depth of the exploring electrode in the hole.

21. A method of investigating the strata traversed by a drill-hole which comprises moving an exploring electrode to different depths in the drill-hole and measuring the electrochemical potential changes created between said exploring electrode and a grounded electrode in circuit therewith by the flow of unidirectional electric current through the electrolytes within the strata, said grounded electrode being located at a position sufficiently remote from the drill-hole so that the measured potential changes are influenced primarily by the horizontal component of said current.

22. A method of investigating the strata traversed by a drill-hole which comprises measuring variations in the relative values of the electrochemical potentials created between an exploring electrode within the drill-hole and a plurality of grounded electrodes in circuit therewith by the flow of unidirectional electric current through the electrolytes within the strata, said grounded electrodes being located in different directions from the drill-hole and each of said grounded electrodes being located at a position sufficiently remote from the drill-hole so that the electrochemical potentials between said grounded electrodes and said exploring electrode are influenced primarily by the horizontal component of said current.

JOHN JAY JAKOSKY.